Aug. 18, 1925.

J. T. BAKER 1,550,138

ROASTING CRADLE

Filed Sept. 28, 1923

WITNESSES

INVENTOR
James T. Baker
BY
ATTORNEY

Patented Aug. 18, 1925.

1,550,138

UNITED STATES PATENT OFFICE.

JAMES T. BAKER, OF BROOKLYN, NEW YORK, ASSIGNOR TO GILLEN, KIMMEY, BAKER SYNDICATE INC., OF NEW YORK, N. Y., A CORPORATION OF NEW YORK.

ROASTING CRADLE.

Application filed September 28, 1923. Serial No. 665,481.

*To all whom it may concern:*

Be it known that I, JAMES T. BAKER, a citizen of the United States, residing in the borough of Brooklyn, in the county of Kings and city and State of New York, have invented new and useful Improvements in Roasting Cradles, of which the following is a specification.

This invention relates to improvements in roasting cradles and has for its object to provide a device which will support fowls or roasts of varying sizes in spaced relation to the bottom of a roasting pan and in such a manner that the roast may be turned without requiring adjustment of the cradle.

Another object of the invention is to provide a device which may be easily and cheaply produced from sheet metal and wire, and so constructed that it may be readily disassembled and cleaned.

A further object of the invention resides in the provision of a roasting cradle so designed that once adjusted while cold to fit the roast being prepared, needs no further adjustment and will retain its position through the frictional contact of its parts one upon the other.

Figure 1:
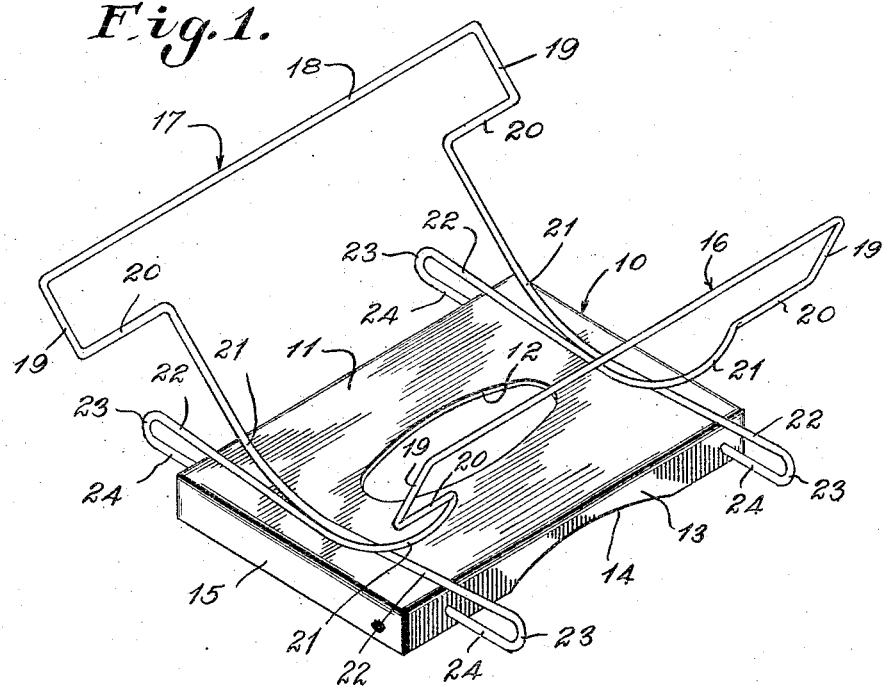
Figure 2:
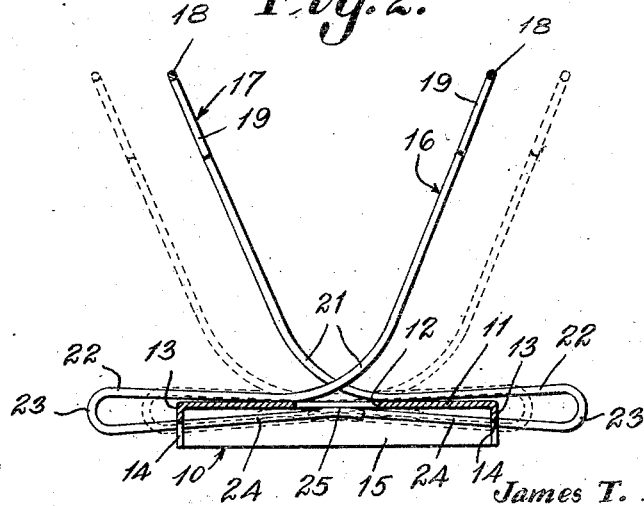

With the above and other objects in view which will become more apparent as the description proceeds, the invention consists in the novel construction, combination and arrangement of parts which will be fully set forth in the following specification, claimed and illustrated in the accompanying drawing in which, Figure 1, is a perspective view of my improved roasting cradle, and Figure 2, is a transverse sectional view through Figure 1.

Referring now to the drawings in detail, the numeral 10 designates in its entirety a base comprising a rectangular plate 11 provided with an elongated centrally located opening 12. Formed integrally with and extending downwardly from the longitudinal edges of the base are flanges 13 which are preferably arched as at 14 intermediate their ends to permit of the free circulation of the juices beneath the plate 11. The opposite end edges of the plate are extended beyond the ends of the flanges 13 and downturned to provide end flanges 15 which cooperate with the flanges 13 in holding the plate 11 in spaced relation to the bottom of the roasting pan and also in stiffening said plate so as to prevent its bending or warping.

Supported by the plate 11 and arranged in such a position with relation thereto as to provide a longitudinally extending U-shaped cradle are the wire frames 16 and 17 each of which comprises a horizontally disposed longitudinally extending bar 18 provided at opposite ends with relatively short downwardly extending arms 19 terminating in inturned horizontal extensions 20 preferably of a length substantially equal to that of the arms 19.

Formed integrally with and gently curving downwardly from the inner end of each extension 20 as at 21 is an arcuate element, the lower end of which connects with the end of one leg 22 of a substantially U-shaped clamping member 23. The opposite leg of each clamping member 23 is projected through an opening formed in each flange 13 as at 24 and into frictional contact with the under side of the plate 11 at 25.

Obviously the frames may be readily adjusted laterally as shown in Figure 2 to fit roasts of differing proportions and owing to the frictional contact of the legs 22 and 24 on the upper and lower sides of the plate 11, the adjustment will be maintained. In order however to further improve the frictional contact of the elements I have found it desirable to arrange opposite openings in the flanges 13 in alignment so that the arms 22 and 24 of one frame will impinge upon the arms 22 and 24 of the opposite frame.

In use the article to be roasted is laid in the cradle formed by the frames 16 and 17 and the same are then moved inwardly or outwardly as illustrated in Figure 2 until the proper adjustment is attained. The cradle together with the roast is then placed in the roasting pan and the cooking proceeds. When the desired brown is attained on the upper side of the roast, it is only necessary to turn it over and lay it back into the cradle, no further adjustment being required. The spacing of the roast from the bottom of the pan precludes the possibility of its burning and sticking and insures perfection in appearance when the roast is finally presented at the table.

While in the foregoing there has been shown and described the preferred embodiment of this invention it is to be understood that minor changes in the details of construction, combination and arrangement of parts may be resorted to without departing from the spirit and scope of the invention as claimed.

What I claim and desire to secure by Letters Patent is:—

A roasting cradle comprising a plate having angularly extending flanges along its edges, the end flanges being cut out intermediate their ends to permit of the free circulation of liquid beneath the plate, opposite side flanges of the base being provided with pairs of spaced aligning openings, substantially U-shaped frames, the legs of said frames being adapted to be received in the openings and to frictionally contact with the under side of the plate whereby the frames are retained in position relative to the base, said frames being bowed to provide a cradle for supporting a roast.

Signed at New York, in the county and State of New York, this 19th day of September, 1923.

JAMES T. BAKER.